(12) United States Patent
Turchi (10) Patent No.: US 8,711,578 B2
(45) Date of Patent: Apr. 29, 2014

(54) METHOD OF FORMING A POWER SUPPLY CONTROLLER AND STRUCTURE THEREFOR

(75) Inventor: Joel Turchi, Gagnac sur Garonne (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 185 days.

(21) Appl. No.: 13/488,712

(22) Filed: Jun. 5, 2012

(65) Prior Publication Data

US 2013/0322130 A1 Dec. 5, 2013

(51) Int. Cl.
*H02M 3/335* (2006.01)

(52) U.S. Cl.
USPC .... 363/20; 363/21.01; 363/21.02; 363/21.03; 363/21.12; 363/21.16; 363/21.17; 363/21.18

(58) Field of Classification Search
USPC .............. 363/20, 21.01, 21.02, 21.03, 21.12, 363/21.16, 21.17, 21.18
See application file for complete search history.

(56) References Cited

U.S. PATENT DOCUMENTS

| | | | |
|---|---|---|---|
| 5,138,543 A | 8/1992 | Harm et al. | |
| 6,469,484 B2 | 10/2002 | L'Hermite et al. | |
| 6,590,789 B2 * | 7/2003 | Bailly | 363/21.12 |
| 6,836,414 B1 * | 12/2004 | Batarseh et al. | 363/17 |
| 6,906,931 B1 * | 6/2005 | Batarseh et al. | 363/17 |
| 6,972,969 B1 | 12/2005 | Shteynberg et al. | |
| 8,179,699 B2 * | 5/2012 | Tumminaro et al. | 363/20 |
| 8,194,420 B2 * | 6/2012 | Tumminaro et al. | 363/21.12 |
| 8,198,874 B2 * | 6/2012 | Melanson | 323/222 |
| 8,248,826 B2 * | 8/2012 | Tumminaro et al. | 363/21.12 |
| 8,451,630 B2 * | 5/2013 | Nania et al. | 363/21.04 |
| 2005/0285587 A1 | 12/2005 | Yang et al. | |
| 2009/0296425 A1 | 12/2009 | Lhermite | |

OTHER PUBLICATIONS

"ST HVLED805 Off-line LED driver with primary-sensing", Oct. 2010, Doc ID 18077 Rev 1, Copyright 2010 STMicroelectronics, pp. 1-29.

"Linear Technology, LT3799 Offline Isolated Flyback LED Controller with Active PFC", LT0112 REV A, Copyright Linear Technology Corporation 2011, pp. 1-20.

Technical Note, "TND371/D Offline LED Driver Intended for Energy Star Residential LED Luminaire Applications", ON Semiconductor GreenPoint Reference Design Documentation Package, TND371/D Rev. 0, Aug. 2009, Semiconductor Components Industries, LLC., pp. 1-15.

"FSEZ1317A Primary-Side Regulation PWM with Power MOSFET Integrated", Jan. 2011, Fairchild Semiconductor, Copyright 2010 Fairchild Semiconductor Corporation FSEZ1317A Rev. 1.0.1, pp. 1-16.

* cited by examiner

*Primary Examiner* — Bao Q Vu
(74) *Attorney, Agent, or Firm* — Robert F. Hightower (57) ABSTRACT

In one embodiment, a power supply controller is configured to adjust a peak value of a primary current through a power switch responsively to a difference between a demagnetization time and a discharge time of the parasitic leakage inductance of a transformer.

20 Claims, 4 Drawing Sheets

METHOD OF FORMING A POWER SUPPLY CONTROLLER AND STRUCTURE THEREFOR

BACKGROUND OF THE INVENTION

The present invention relates, in general, to electronics, and more particularly, to semiconductors, structures thereof, and methods of forming semiconductor devices.

In the past, the electronics industry utilized various methods and structures to form switching power supply controllers for power supply systems. One example of such a system was a flyback power supply system. In some applications, it was desirable to estimate the output current from a primary side of the power supply. Some applications utilized an auxiliary voltage from an auxiliary winding of a transformer to assist in estimating the value of the output current. In some cases, using the auxiliary voltage resulted in inaccurately estimating the value of the output current.

Accordingly, it is desirable to have a method and circuit that more accurately estimates the value of the output current.

For simplicity and clarity of the illustration(s), elements in the figures are not necessarily to scale, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, and that conductivity type does not refer to the doping concentration but the doping type, such as P-type of N-type. It will be appreciated by those skilled in the art that the words during, while, and when as used herein relating to circuit operation are not exact terms that mean an action takes place instantly upon an initiating action but that there may be some small but reasonable delay (s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

DETAILED DESCRIPTION OF THE DRAWINGS

Figure 1:
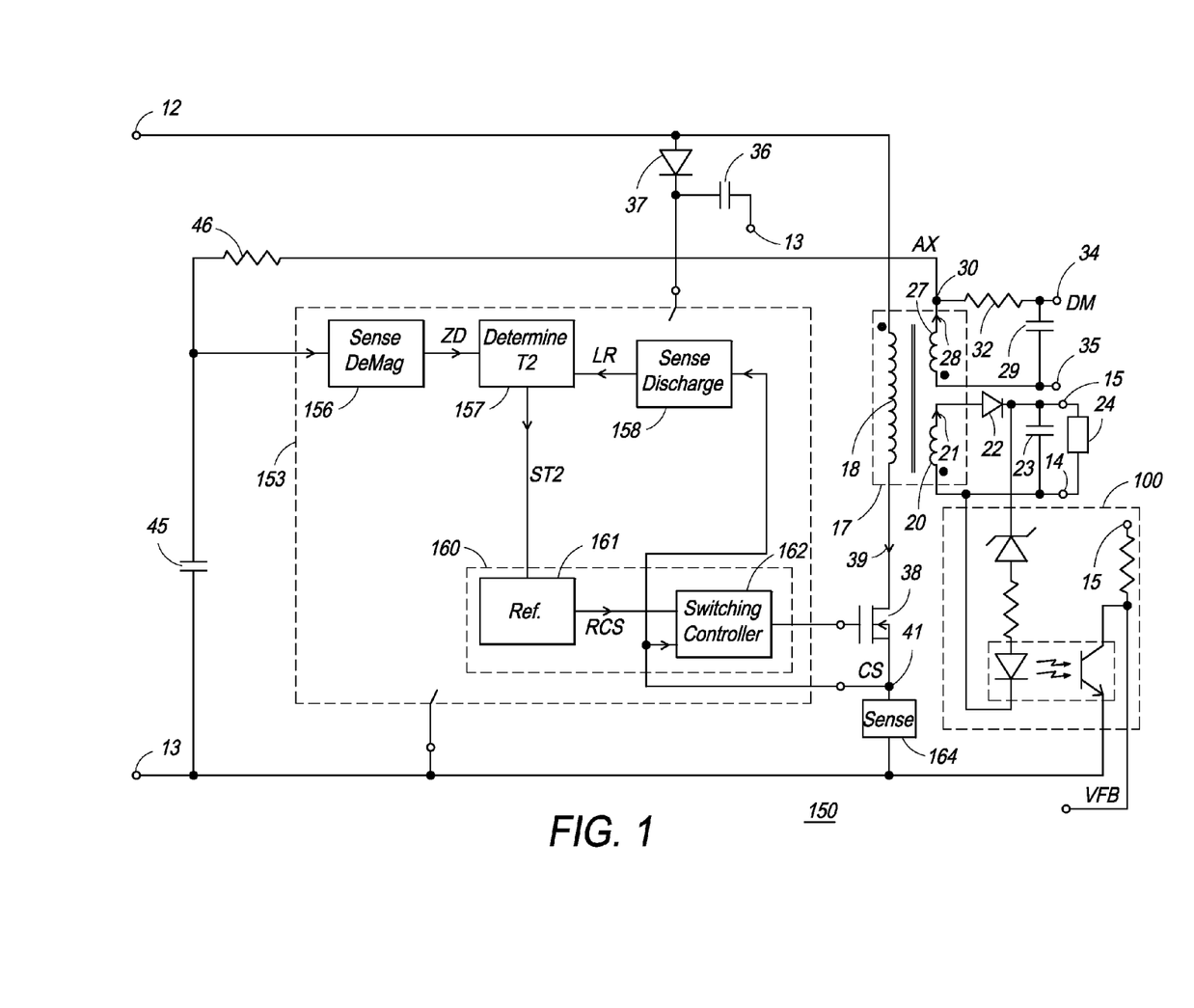
FIG. 1 schematically illustrates an example of an embodiment of a portion of a power supply system in accordance with the present invention.

FIG. 1 schematically illustrates an example of an embodiment of a power supply system 150. System 150 receives power and an input voltage between an input terminal 12 and a common return terminal 13. System 150 typically includes a transformer 17 having a primary winding 18, a secondary winding 20, and an auxiliary winding 27. Secondary winding 20 is utilized to form an output voltage between an output terminal 15 and a return terminal 14 in order to supply a load current 21 and the output voltage to a load 24. Those skilled in the art will understand that transformer 17 also has a parasitic leakage inductance that is not shown in FIG. 1. A diode 22 typically is utilized to rectify the voltage from winding 20 to form the output voltage which is filtered by capacitor 23. Auxiliary winding 27 is used to form an auxiliary voltage (AX). In some optional embodiments, voltage AX may also be utilized to form a supply voltage (not shown) for operating portions of system 150. In an optional embodiment, the voltage from winding 27 may also be used to form other voltages such as the optional voltage between an output terminal 34 and a return terminal 35.

System 150 includes a power switch, illustrated in this embodiment by a power transistor 38, that is controlled to regulate the value of current 21 to a desired value or target value within a range of values around the target value. For example, the target value may be five hundred milli-amperes (500 ma.) and the range of values may be plus or minus five percent (5%) around the five hundred milli-amperes. Transistor 38 is configured to conduct a primary current 39 to flow through primary winding 18 of transformer 17. A current sense element 164 is configured to receive primary current 39 and form a current sense (CS) signal that is representative of the value of current 39. The CS signal may be formed at a node 41.

Some embodiments of system 150 may also include an optional voltage feedback circuit 100 that is configured to receive the output voltage between terminals 15 and 14 and form a voltage feedback signal (VFB) that is representative of the value of the output voltage.

System 150 also includes a power supply controller 153 that is configured to form a switching control signal to regulate an output current 21 from winding 20 to the desired value. A diode 37 and a capacitor 36 may be configured to receive the voltage from terminal 12 and form an input voltage to controller 153 for operating elements within controller 153. In another embodiment, diode 37 may be connected to receive AX instead of connected to terminal 12. This configuration typically is used for application where the voltage on input 12 is greater than a voltage that may damage diode 36 or controller 153. Although transistor 38 is illustrated as external to controller 153, in some embodiments, transistor 38 may be formed as a portion of controller 153.

Controller 153 typically includes a circuit 156 configured to form a first signal (ZD), or a zero detect signal, that is representative of a demagnetization time of transformer 17, a circuit 158 that is configured to form a second signal (LR), or leakage reset signal, that is representative of a discharge time of the parasitic leakage inductance of transformer 17, and a third circuit 157 configured to form a signal (ST2), or compensation control signal, that is representative of a difference between the demagnetization time and the discharge time of the parasitic leakage inductance. Another circuit 160, referred to in some embodiments as a reference generation circuit, of controller 153 is configured to use the signal from circuit 157 to adjust an ON-time of transistor 38 responsively to the difference between the demagnetization time and the discharge time of the parasitic leakage inductance.

In another embodiment, circuit 160 includes a reference generation circuit or Ref 161 that is configured to use the signal from circuit 157 to form a current reference signal (RCS) having a value that varies responsively to the signal from circuit 157. In this embodiment, circuit 160 also includes a switching control circuit 162 that receives the current sense signal (CS) and the current reference signal (RCS), and adjusts the ON-time of transistor 38 responsively to changes of the current reference signal (RCS). Those skilled in the art will appreciate that circuit 162 may be a pulse width modulation controller or any other well-known type of switching controller.

In an optional embodiment, controller 153 may utilize the value of the voltage feedback signal (VFB) to assist in controlling transistor 38.

Figure 2:
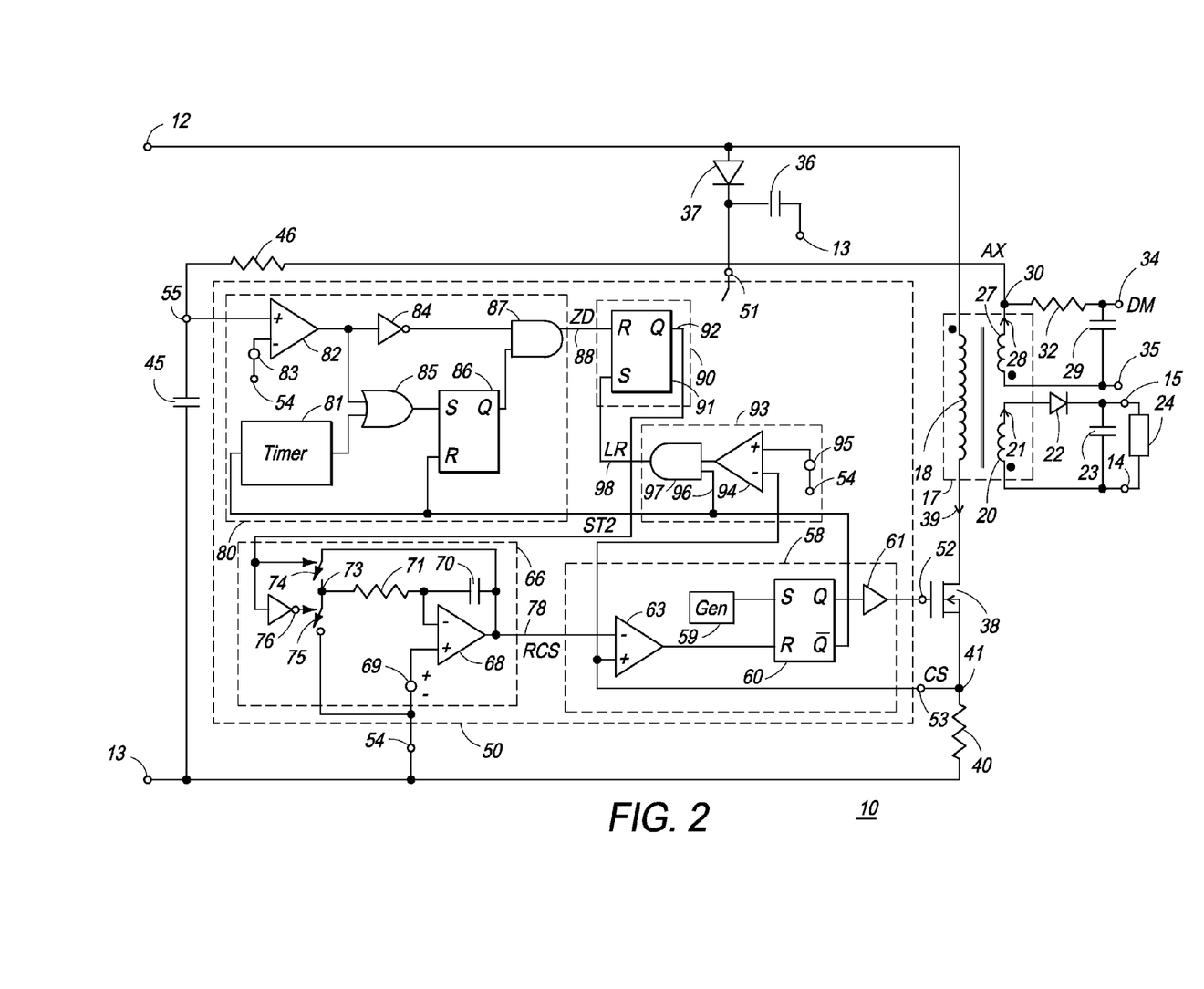
FIG. 2 schematically illustrates an example of an embodiment of another power supply system that is an alternate embodiment of the system of FIG. 1 in accordance with the present invention.

FIG. 2 schematically illustrates an example of an embodiment of a power supply system 10 that is an alternate embodiment of system 150. System 10 includes a power supply controller 50 that is an alternate embodiment of and that functions substantially similar to controller 153. Although transistor 38 is illustrated as external to controller 50, in some embodiments, transistor 38 may be formed as a portion of controller 50. Controller 50 is connected to receive an input voltage for operating controller 50 on a voltage input 51 and has a common return 54 connected to a common voltage return such as terminal 13. Controller 50 includes a demag input 55 that is configured to receive a signal that is representative of the auxiliary voltage (AX) from auxiliary winding 27. In some embodiments, an optional resistor 46 may be connected to input 55 in order to assist in limiting current in the electro-static protection elements (not shown) related to input 55. A driver output 52 of controller 50 is configured to form the switching control signal to control the power switch, represented by transistor 38. Those skilled in the art will appreciate that in an alternate embodiment, transistor 38 may be a portion of controller 50 instead of external to controller 50 and may be a different type of switch device. A current sense input 53 is configured to receive the current sense (CS) signal that is representative of the value of current 39. A resistor 40 is utilized as an alternate embodiment of current sense element 164 (FIG. 1). A demag detect circuit 80 is configured to receive the AX signal from input 55 and form the zero detect (ZD) signal 88 that is representative of a demagnetization time of transformer 17. Circuit 80 is an alternate embodiment of circuit 156 illustrated in FIG. 1. For the example embodiment of circuit 80 illustrated in FIG. 2, circuit 80 includes a timer 81, a comparator 82, a voltage reference 83, an inverter 84, an OR gate 85, a latch 86, and an AND gate 87. A discharge sense circuit or leakage detect circuit 93 is configured to form the leakage reset (LR) signal 98 that is representative of a discharge time of the parasitic leakage inductance of transformer 17. For the example embodiment of circuit 93 that is illustrated in FIG. 2, circuit 93 includes a comparator 94, a voltage reference 95, and an AND gate 97. A compensation circuit 90 of controller 50 is configured to receive LR signal 98 and ZD signal 88 and form the compensation control (ST2) signal 92 that is representative of a difference between the magnetization time of transformer 17 and the discharge time of the parasitic leakage inductance of transformer 17. The illustrated embodiment of circuit 90 includes a latch 91. Circuit 50 also includes a reference generation circuit 66 that is configured to form current reference (RCS) signal 78 to have a value that varies responsively to ST2 signal 92. The illustrated embodiment of circuit 66 includes an amplifier 68, a voltage reference 69, a capacitor 70, a resistor 71, switches 74 and 75, and an inverter 76. A switching control circuit 58 of controller 50 is an alternate embodiment of switching controller 162 illustrated in FIG. 1. Circuit 58 typically includes a clock generator (Gen) 59, a control latch 60, and a control comparator 63. In some embodiments circuit 58 may also include a driver or buffer 61.

Figure 3:
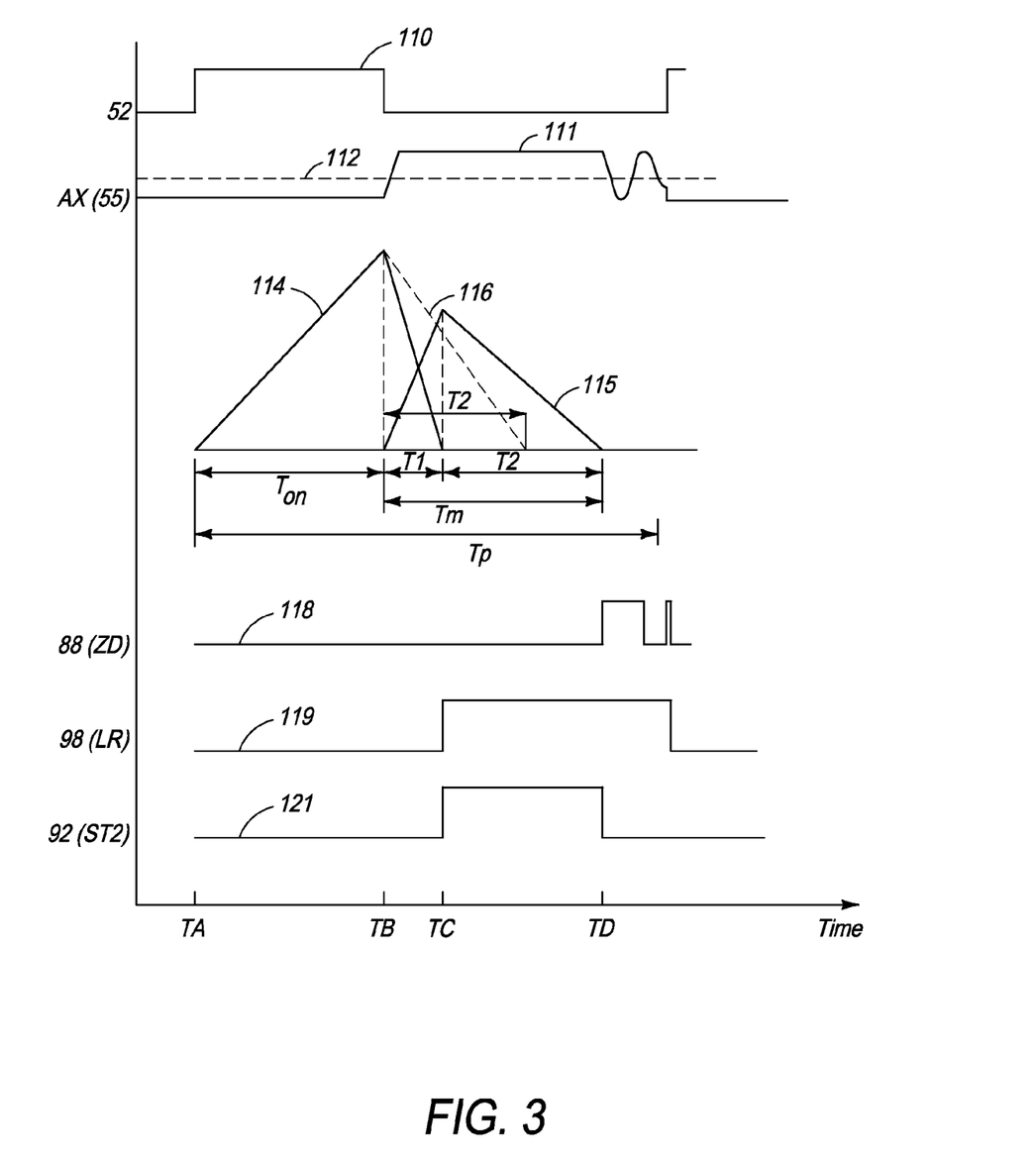
FIG. 3 is a graph having plots that illustrate some of the signals of the systems 150 and system 10 during the operation of systems the systems of FIG. 1 and FIG. 2 in accordance with the present invention.

FIG. 3 is a graph having plots that illustrate some of the signals of system 150 and system 10 during the operation of systems 10 and or 150. The abscissa indicates time and the ordinate indicates increasing value of the illustrated signal. A plot 110 illustrates the switching control signal on output 52, a plot 111 illustrates the signal on input 55 that is representative of the AX signal, a plot 114 illustrates the value of current 39, a plot 115 illustrates the value of current 21, a plot 118 illustrates ZD signal 88, a plot 119 illustrates LR signal 98, and a plot 121 illustrates ST2 signal 92. Those skilled in the art will appreciate that the signals illustrated n FIG. 3 are for a transformer with a turns ratio of 1:1. This description has references to FIG. 1-FIG. 3.

During the operation of system 10, transistor 38 is enabled to form current 39 through primary inductor 18. When transistor 38 is disabled, current 21 begins to flow in secondary winding 20 as illustrated by plot 115 as illustrated at a time TB. As is well-known to those skilled in the art, the parasitic leakage inductance of transformer 17 affects currents 39 and 21. As illustrated by plot 114, when transistor 38 is disabled at time TB, the parasitic leakage inductance of transformer 17 prevents current 39 from immediately falling to zero and causes current 39 to continue flowing at some value illustrated by plot 114 between times TB and TC. The parasitic leakage inductance also slows the rise of current 21 as illustrated by plot 115 and prevents current 21 from reaching the ideal peak value current 21 would have without the parasitic leakage inductance. The period of the switching control signal is illustrated by a time interval or time Tp, and the ON-time of transistor 38 and of the switching control signal is illustrated as a time interval or time Ton. The demagnetization time or demag time of transformer 17 is illustrated as a time interval or time TM, and the time to discharge the parasitic leakage inductance of transformer 17 is illustrated by a time interval or time T1. A plot 116, shown in dashed lines, assists in explaining a technique to determine current 21. Plot 116 illustrates that current 39 could fall to zero at time TB and current 21 also could increase to have a larger peak value at time TB and would then slowly decrease as the energy from winding 18 is transferred to winding 20. The time that current 21 flows in plot 116 is represented by a time interval or time T2. As can be seen, the magnetization time TM includes an unwanted component of the time T1 that usually is a time in which the parasitic leakage inductance of transformer 17 is discharged. If the total demagnetization time TM is utilized to adjust the peak value of current 39, then the resulting value of current 21 would be inaccurate.

Controller 50 is formed to sense the demagnetization time TM of transformer 17, to sense the discharge time T1 of the parasitic leakage inductance of transformer 17, and to adjust a peak value of current 39 responsively to a difference between the demagnetization time TM and the discharge time T1 of the parasitic leakage inductance. As can be seen from FIG. 3, subtracting the time T1 from the demagnetization time TM results in a compensated time interval or compensated time T2 that represents the idealized time, without the parasitic leakage inductance, for current 21 to increase to the peak value and to then become substantially zero as transformer 17 becomes demagnetized. Using compensated time T2 to control the peak value of current 39, thus the value of current 21, results in more accurately controlling the value of current 21.

Those skilled in the art will appreciate that the area of the triangle formed by plot 116 is the same as the area of the triangle formed by plot 115. The matching between the areas of the two triangles allows for computing the average value of the output current as shown in the following representative equations:

$$I21=(I39pk/2N)*(T2/TP)$$

Where:
I21—average value of secondary output current 21,
I39pk—peak value of primary current 39,
N—Primary to secondary turns ratio (Nsecondary/Nprimary),
TP—time interval or period of the switching control signal on output 52,
TM—Demagnetization or Demag time of transformer 17,
T1—discharge time interval of the parasitic leakage inductance of transformer 17,
T2—TM−T1=compensated time interval for current 21.
Primary current I39 can be expressed as:

$$I39=VCS/R40$$

where:
VCS—voltage of the current sense signal (41)
R40—value of resistor 40

Thus, $I21=((VCS/R40)/2N)*(T2/TP)$

Configure for $VCS=V69(TP/T2)$

Where:
V69—value of the reference voltage from reference 69.
Thus current 21 can be expressed as:

$$I21=V69/(2N*R40).$$

Consequently, the value of current 21 can be controlled by the value of reference 69, the turns ratio, and the value of resistor 40. Since the turns ratio and the value of resistor 40 are external to controller 50, one can control the value of current 21 by knowing the value of reference 69 and then selecting the value of the turns ratio and resistor 40.

In operation assume that at a time TA the switching control signal on output 52 is asserted thereby enabling transistor 38 to conduct current 39. The value of current 39 increases until reaching the peak value near time TB which causes circuit 58 to disable transistor 38 as illustrated by plot 110. For example, comparator 63 may become asserted to negate the switching control signal. Disabling transistor 38 couples energy into windings 20 and 27 thereby causing the value of the auxiliary voltage (AX) to increase and causing the value of current 21 to increase. Because of the parasitic leakage inductance, the value of current 39 slowly decreases during time T1 and reaches approximately zero at a time TC. Circuit 93 receives the CS signal and asserts LR signal 98 responsively to completion of the discharge time of the parasitic leakage inductance at the end time T1. Asserting LR signal 98 sets latch 91 thereby asserting ST2 signal 92. In the preferred embodiment, the S and R inputs of latch 91 are rising-edge triggered. In other embodiments, the S and R inputs may function differently based upon the configuration of the remainder of circuits 80 and 93. Other latches of controller 50 may be edge or level triggered. Current 21 continues to increase as illustrated by plot 115 until reaching a peak value and then slowly decreases as the energy coupled into winding 20 is discharged by current 21. As current 21 reaches near zero or near a reference value that is near zero, the value of the auxiliary voltage decreases to a value near zero at a time TD. As the AX signal becomes less than reference 83, the output of comparator 82 is negated which asserts ZD signal 88 as illustrated by plot 118 at time TD. Those skilled in the art will understand that the AX signal generally oscillates after time TD and may cause subsequent transitions of ZD signal 88 as illustrated by respective plots 111 and 118. Those skilled in the art will also appreciate that in some embodiments, the value of AX starts to drop near the end of time TM but the valley value or lowest value of AX may occur some small time later. In such embodiments, an optional delay element may be used to delay the Ax voltage and the time of the actual zero dection. One embodiment of such an optional delay element is illustrated as an optional capacitor 45. In other embodiments, the delay element may not be used or may be other delay configurations such as a delay line or a digital delay. Asserting signal 88 resets latch 91 thereby negating ST2 signal 92. The resulting time T2 represents the difference between the demagnetization time TM and the discharge time T1 of the parasitic leakage inductance.

In one embodiment, circuit 66 is configured to use the compensation control signal ST2 to form current reference signal RCS having a value that varies responsively to the compensation control signal ST2 wherein the switching control circuit adjusts the ON-time of the power switch responsively to changes of the current reference signal. Circuit 66 uses the ST2 signal to decrease a value of the RCS signal during the difference between the demagnetization time and the discharge time of the parasitic leakage inductance, and to increase the value of the RCS signal for a remainder of the period of the switching control signal. The remainder of the period of the switching control signal can be expressed as Tp−T2. Circuit 93 can be viewed as a circuit that subtracts the discharge time of the parasitic leakage inductance from the demag time and forms the ST2 signal to represent the difference between the two times.

As will be seen further hereinafter, circuit 66 is configured to decrease the value of the RCS signal responsively to the asserted state of the ST2 signal and to increase the value of the RCS signal responsively to the negated state of the ST2 signal. Circuit 66 adjusts the ON-time of transistor 38 responsively to changes of the RCS signal. Because the RCS value of the RCS signal is adjusted substantially without or substantially devoid of the effect of the parasitic leakage current time T1, the resulting value of current 21 is more accurately controlled. Also, the value of current 21 is controlled in a more cost effective manner since the cost of an opto-coupler and other associated elements are reduced. Circuit 66 closes switch 74 and opens switch 75 responsively to the asserted state of the ST2 signal to couple capacitor 70 in a charging configuration and increase the value of the RCS signal. In response to the negated state of the ST2 signal, circuit 66 closes switch 75 and opens switch 74 to decrease the value of the RCS signal. As the value of the RCS signal varies, the ON-time of transistor 38 also varies.

Since the ON-time of transistor 38 is adjusted based on the primary current the value of current 21 is more accurately controlled. Additionally, the value of RCS signal 78 is adjusted without or devoid of a circuit that simulates the value of the primary current, such as a circuit to sample and hold the value of the primary current and then adjust the stored value. Thus, the value of current 21 is more accurately controlled. In one example application, the value of current 21 had an accuracy of plus or minus one and six tenths of a percent (+/− 1.6%).

Circuit 58 uses the value of the RCS signal and the CS signal to control the value of the ON-time of transistor 38. Comparator 63 compares the CS signal to the RCS signal and adjusts the ON-time of transistor 38 responsively to a difference between the demagnetization time and the discharge time of the parasitic leakage inductance.

In an alternate embodiment of circuit 50, comparator 94 may be omitted and comparator 63 may be used to assist in forming signal 78. For example, comparator 63 may include hysteresis on the inputs such that a lower value of the hysteresis may be used to detect the reset time of the parasitic inductance and assist in forming signal 78, and an upper value of the hysteresis may be used to detect current 39 exceeding a desired upper limit of current 39. Controller 50 may use detecting the desired upper limit value of current 39 to cause circuit 50 to disable transistor 38.

Those skilled in the art will appreciate that in other embodiments, other signals may be used to form the signal that is representative of the demagnetization time of transformer 17 instead of using the AX signal from an auxiliary winding. For example the value of the gate voltage of transistor 38 may be used to form ZD signal 88 as described in U.S. Pat. No. 6,469,484 which is hereby incorporated herein by reference. As explained in U.S. Pat. No. 6,469,484, the value of the gate voltage has a spike in voltage as the transformer becomes demagnetized and this change in gate voltage can be detected to form the signal that is representative of the demagnetization time of transformer 17. For example, a comparator, such as a transistor configured as a comparator or an amplifier configured as a comparator, can be used to compare the gate voltage to a reference voltage to form the signal that is representative of the demagnetization time of transformer 17. Alternately, the source voltage of transistor 38 may be used to form the signal that is representative of the demagnetization time of transformer 17 as described in U.S. Pat. No. 6,469, 484. For example a comparator can be used to compare the source voltage to a reference voltage to form the signal that is representative of the demagnetization time of transformer 17. In such embodiments, transformer may not include winding 27 and the associated circuitry.

One skilled in the art will understand that in some embodiments a clamping network may be used to protect the power switch, such as transistor 38, from excessive voltages such as when the power transistor is switched off. One embodiment of such a clamping network may include a clamping resistor, a clamping capacitor, and a clamping diode. The clamping resistor may have a first terminal connected to terminal 12, and a second terminal commonly connected to a first terminal of the clamping capacitor and to a first terminal of the clamping diode. A second terminal of the clamping diode may be connected to a drain of transistor 38. A second terminal of the clamping capacitor could be connected to node 41 so that any reset current that flows through the clamping capacitor when the source voltage of transistor 38 exceeds the voltage on the clamping capacitor one can be sensed at CS input 53. Those skilled in the art will appreciate that such a clamping network minimizes the reset current that makes the power switch voltage rise above its breakdown voltage, which otherwise might lead to damaging transistor 38. Those skilled in the art will further understand that other elements that can divert part of the reset current should be connected so that the diverted current can also be sensed at input 53. It can be the case of a snubber circuit for instance In order to facilitate the functionality described hereinbefore, input 55 is connected to a non-inverting input of comparator 82 which has an inverting input connected to a first terminal of reference 83. A second terminal of reference 83 is connected to return 54. An output of comparator 82 is commonly connected to an input of inverter 84 and a first input of or gate 85. A second input of or gate 85 is connected to an output of timer 81. An input of timer 81 is connected to receive an inverting state of the switching control signal. The input of timer 81 is commonly connected to a reset input of latch 86, a first input of AND gate 97, and to a Qbar or inverting output of latch 60. A set input of latch 86 is connected to an output of or gate 85. An output of inverter 84 is connected to a first input of and gate 87. A second input of and gate 87 is connected to a Q output of latch 86 and an output of gate 87 is configured to form signal 88 and is connected to a reset input of latch 91. A set input of latch 91 is connected to an output of gate 97. A second input of gate 97 is connected to an output of comparator 94 which has an inverting input commonly connected to a non-inverting input of comparator 63 and to input 53 in order to receive the CS signal. A non-inverting input of comparator 94 is connected to a first terminal of reference 95 which has a second terminal connected to return 54. A Q output of latch 91 is connected to an input of circuit 66. The input of circuit 66 is commonly connected to a control electrode of switch 74 and to an input of inverter 76 which has an output connected to a control electrode of switch 75. A first terminal of switch 74 is commonly connected to a first terminal of capacitor 70, an output of amplifier 68, and to an inverting input of comparator 63. A second terminal of capacitor 70 is commonly connected to an inverting input of amplifier 68 and to a first terminal of resistor 71. A second terminal of resistor 71 is commonly connected to node 73, a second terminal of switch 74, and a first terminal of switch 75. A second terminal of switch 75 is connected to return 54 and to a first terminal of reference 69. A second terminal of reference 69 is connected to a non-inverting input of amplifier 68. An output of comparator 63 is connected to a reset input of latch 60. A set input of latch 60 is connected to an output of generator 59. A Q output of latch 60 is connected to an input of buffer 61 which has an output connected to output 52.

Figure 4:
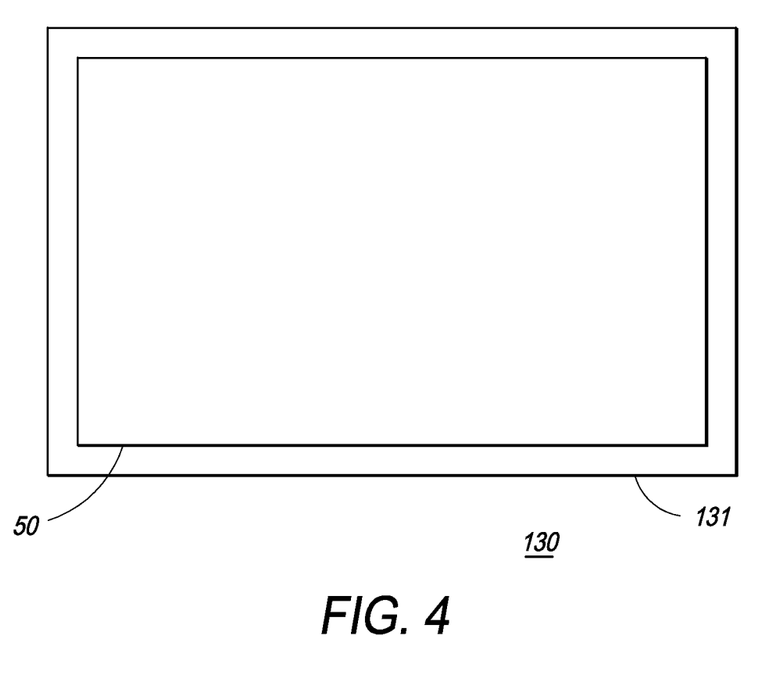
FIG. 4 illustrates an enlarged plan view of a semiconductor device that includes the system of FIG. 1 and/or FIG. 2 in accordance with the present invention.

FIG. 4 illustrates an enlarged plan view of a portion of an embodiment of a semiconductor device or integrated circuit 130 that is formed on a semiconductor die 131. Controller 50 and or 153 is/are formed on die 131. Die 131 may also include other circuits that are not shown in FIG. 4 for simplicity of the drawing. Controller 50 or 153 and device or integrated circuit 130 are formed on die 131 by semiconductor manufacturing techniques that are well known to those skilled in the art.

Those skilled in the art will appreciate that in one embodiment, a power supply controller may comprise:

a switching control circuit, such as circuit 58 or 162 for example, configured to form a switching control signal to control a power switch to regulate an output current, current 21 for example, through a transformer to a desired value, the switching control signal having a period, the transformer including a secondary winding to conduct a secondary current, the transformer also including an auxiliary winding to form an auxiliary voltage, and the transformer further including a parasitic leakage inductance;

a demag detect circuit, for example circuit 80 or 156, configured to receive a signal representative of the auxiliary voltage and form a zero detect signal, such as the ZD signal, representative of a demagnetization time of the transformer wherein the secondary current decreases to a substantially zero value;

a leakage detect circuit, for example circuit 93 158, configured to form a leakage reset signal, signal LR for example, responsively to completion of a discharge time of the parasitic leakage inductance;

a compensation circuit, such as circuit 90 or 157 for example, configured to receive the leakage reset signal and the zero detect signal and form a compensation control signal, the ST2 signal for example, representative of a difference between the demagnetization time and the discharge time of the parasitic leakage inductance; and a reference generation circuit, such as circuit 66 or 161, configured to use the compensation control signal to form a current reference signal, for example the RCS signal, having a value that varies responsively to the compensation control signal wherein the switching control circuit adjusts an ON-time of the power switch responsively to changes of the current reference signal.

Another embodiment of the power supply controller may include that the compensation circuit is configured to subtract the discharge time of the parasitic leakage inductance from the demagnetization time of the inductor to form the compensation control signal.

Another embodiment may include that the compensation circuit is configured to assert the compensation control signal responsively to the leakage reset signal and to negate the compensation control signal responsively to the zero detect signal.

Other embodiments may include that the switching control circuit adjusts the ON-time of the power switch inversely proportional to the difference between the demagnetization time and the discharge time of the parasitic leakage inductance, or alternately proportionally to changes of the current reference signal.

Another embodiment of the power supply controller may include that the reference generation circuit is configured to charge a capacitor during the difference between the demagnetization time and the discharge time of the parasitic leakage inductance, and to discharge the capacitor for the remainder of the period of the switching control signal.

Those of ordinary skill in the art will appreciate that a method of forming a power supply controller may comprise:

forming the power supply controller, for example controller 50 or 153, to form a switching control signal, such as the signal on output 52 for example, to control a power switch, for example transistor 38, to regulate an output current, current 21 for example, through a transformer to a desired value wherein the transformer includes a secondary winding to conduct a secondary current, and also includes a parasitic leakage inductance;

configuring the power supply controller to form a first signal, the ZD signal for example, representative of a demagnetization time of the transformer and to form a second signal, such as the LR signal for example, representative of a discharge time of the parasitic leakage inductance;

configuring the power supply controller to use the first signal and the second signal to form a third signal, such as the ST2 signal for example, that is representative of a difference between the demagnetization time and the discharge time of the parasitic leakage inductance; and configuring a first circuit, such as circuit 160 of the power supply controller to use the third signal to adjust an ON-time of the power switch responsively to the difference between the demagnetization time and the discharge time of the parasitic leakage inductance.

Another embodiment of the method may include configuring the power supply controller to form the first signal to detect an end of the demagnetization time.

Yet another alternate embodiment may include configuring the power supply controller to form the second signal to detect an end of the discharge time of the parasitic leakage inductor.

The method may further include configuring the circuit to form a current reference signal, such as the RCS signal for example, having a value that varies responsively to the difference between the demagnetization time and the discharge time of the parasitic leakage inductance.

Another embodiment of the method may include configuring the power supply controller to compare the current reference signal to a current sense signal having a value that is representative of a value of a primary current through the power switch, and to vary the ON-time of the switching control signal responsively to a difference between the current sense signal and the current reference signal.

Those skilled in the art will further understand that a method of forming a power supply controller may comprise:

forming the power supply controller to form a switching control signal, such as signal 52, to control a power switch, for example transistor 38, to regulate an output current, such as current 21 for example, through a transformer to a desired value wherein the transformer includes a secondary winding to conduct a secondary current, and a parasitic leakage inductance;

forming the power supply controller to sense a demagnetization time of the transformer, such as the sensing of circuit 80 or 156 for example or sensing one of the gate voltage or source voltage of the power switch;

forming power supply controller to sense a discharge time of the parasitic leakage inductance, such as the sensing of circuit 93 or 158, for example; and forming the power supply controller to adjust a peak value of a primary current, current 39 for example, through the power switch responsively to a difference between the demagnetization time and the discharge time of the parasitic leakage inductance.

An alternate embodiment of the method may include forming the power supply controller to form a first signal, such as the LR signal for example, representative of an end of the discharge time of the parasitic leakage inductance.

Another embodiment of the method may include forming the power supply controller to form a second signal, signal ZD signal for example, representative of an end of the demagnetization time of the transformer.

An alternate method embodiment may include forming the power supply controller to form a third signal, such as signal ST2 signal for example, that is representative of the difference between the demagnetization time and the discharge time of the parasitic leakage inductance and to use the third signal to adjust a value of a current reference signal, adjust the value of the RCS signal for example, used to adjust an ON-time of the power switch.

In view of all of the above, it is evident that a novel device and method is disclosed. Included, among other features, is forming the power supply controller to control the value of current 21 using the demag time minus the discharge time of the parasitic leakage inductance. This results in more accurate control of the value of current 21. Also, varying the value of a reference signal responsively to the difference between the demagnetization time and the discharge time of the parasitic leakage inductance facilitates controlling the value of current 21 responsively to the difference between the demagnetization time and the discharge time of the parasitic leakage inductance to more accurately control the value of current 21.

While the subject matter of the descriptions are described with specific preferred embodiments and example embodiments, the foregoing drawings and descriptions thereof depict only typical and exemplary embodiments of the subject matter and are not therefore to be considered to be limiting of its scope, it is evident that many alternatives and variations will be apparent to those skilled in the art. As will be appreciated by those skilled in the art, the exemplary form of systems 150 and 10 and controllers 153 and 50 are used as a vehicle to explain the operation method of controlling the value of current 21 responsively to the difference between the demagnetization time and the discharge time of the parasitic leakage inductance. Although controller 50 is illustrated in a flyback power supply system application, controller 50 may be used in various other well-known types of power supply systems. Those skilled in the art will appreciate that the example embodiment of controller 50 illustrated in FIG. 2 may be configured with various other embodiments in addition to the preferred embodiment illustrated in FIG. 2 as long as the alternative embodiment includes a method of forming the controller to control the value of current 21 responsively to the difference between the demagnetization time and the discharge time of the parasitic leakage inductance. For example, circuit 80 may be replaced by various well-known alternative circuits that are formed to form the demagnetization time interval of transformer 17. Also, circuit 58 may be replaced by any well-known alternative switching control circuits such as a pulse frequency modulation circuit. Circuit 93 may be replaced by a different configuration as long as the alternated embodiment is configured to form a leakage reset signal responsively to completion of a discharge time of the parasitic leakage inductance of transformed 17. An additional alternate embodiment may include a means for detecting the demagnetization time of transformer 17. For example the means for detecting could include a means for sensing a threshold value of the gate voltage of transistor 38 or a means for sensing the source voltage of transistor 38 for detecting a threshold value of either of the gate or source voltages.

Furthermore, the drawings described are only schematically and are non-limiting. In the drawings, the size of some of the elements may be exaggerated and not drawn on scale for illustrative purposes. The dimensions, waveforms, and the relative dimensions do not correspond to actual reductions to practice of the invention.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A power supply controller comprising:
   a switching control circuit configured to form a switching control signal to control a power switch to regulate an output current through a transformer to a desired value, the switching control signal having a period, the transformer including a secondary winding to conduct a secondary current, the transformer also including an auxiliary winding to form an auxiliary voltage, and the transformer further including a parasitic leakage inductance;
   a demag detect circuit configured to receive a signal representative of the auxiliary voltage and form a zero detect signal representative of a demagnetization time of the transformer;
   a leakage detect circuit configured to form a leakage reset signal responsively to completion of a discharge time of the parasitic leakage inductance;
   a compensation circuit configured to receive the leakage reset signal and the zero detect signal and form a compensation control signal that is representative of a difference between the demagnetization time and the discharge time of the parasitic leakage inductance; and
   a reference generation circuit configured to use the compensation control signal to form a current reference signal having a value that varies responsively to the compensation control signal wherein the switching control circuit adjusts an ON-time of the power switch responsively to changes of the current reference signal.

2. The power supply controller of claim 1 wherein the compensation circuit is configured to subtract the discharge time of the parasitic leakage inductance from the demagnetization time of the transformer to form the compensation control signal.

3. The power supply controller of claim 1 wherein the compensation circuit is configured to assert the compensation control signal responsively to the leakage reset signal and to negate the compensation control signal responsively to the zero detect signal.

4. The power supply controller of claim 2 wherein the compensation circuit includes a latch configured to assert the compensation control signal responsively to the leakage reset signal and to negate the control signal responsively to the zero detect signal.

5. The power supply controller of claim 2 wherein the leakage detect circuit includes a comparator configured to compare a current sense signal to a reference voltage wherein the current sense signal is representative of a primary current through the power switch, an AND gate coupled to receive an output of the comparator on a first input and to receive a drive signal representative of an inversion of the switching control signal on a second input wherein an output of the AND gate forms the leakage reset signal.

6. The power supply controller of claim 1 wherein the switching control circuit adjusts the ON-time of the power switch inversely proportional to changes of the current reference signal.

7. The power supply controller of claim 1 wherein the switching control circuit adjusts the ON-time of the power switch inversely proportional to the difference between the demagnetization time and the discharge time of the parasitic leakage inductance.

8. The power supply controller of claim 1 wherein the reference generation circuit is configured to decrease a value of the current reference signal during the difference between the demagnetization time and the discharge time of the parasitic leakage inductance, and to increase the value of the current reference signal for a remainder of a period of the switching control signal.

9. The power supply controller of claim 8 wherein the reference generation circuit is configured to charge a capacitor during the difference between the demagnetization time and the discharge time of the parasitic leakage inductance, and to discharge the capacitor for the remainder of the period of the switching control signal.

10. The power supply controller of claim 9 wherein the reference generation circuit includes an amplifier having the capacitor coupled between an output of the amplifier and a first input of the amplifier; a fixed reference voltage coupled to a second input of the amplifier; a first switch configured to couple the output of the amplifier to the capacitor responsively to an asserted state of the compensation control signal; and a second switch configured to discharge the capacitor responsively to a negated state of the compensation control signal.

11. A method of forming a power supply controller comprising:
   forming the power supply controller to form a switching control signal to control a power switch to regulate an output current through a transformer to a desired value wherein the transformer includes a secondary winding to conduct a secondary current, and a parasitic leakage inductance;
   configuring the power supply controller to form a first signal representative of a demagnetization time of the transformer and to form a second signal representative of a discharge time of the parasitic leakage inductance;
   configuring the power supply controller to use the first signal and the second signal to form a third signal that is representative of a difference between the demagnetization time and the discharge time of the parasitic leakage inductance; and
   configuring a first circuit of the power supply controller to use the third signal to adjust an ON-time of the power switch responsively to the difference between the demagnetization time and the discharge time of the parasitic leakage inductance.

12. The method of claim 11 wherein configuring the power supply controller to form the first signal includes configuring the power supply controller to form the first signal to detect an end of the demagnetization time.

13. The method of claim 12 wherein configuring the power supply controller to form the first signal includes configuring the power supply controller to form the second signal to detect an end of the discharge time of the parasitic leakage inductance.

14. The method of claim 11 wherein configuring the circuit of the power supply controller to use the third signal to adjust the ON-time of the switching control signal includes configuring the circuit to form a current reference signal having a value that varies responsively to the difference between the demagnetization time and the discharge time of the parasitic leakage inductance.

15. The method of claim 14 further including configuring the power supply controller to compare the current reference signal to a current sense signal having a value that is representative of a value of a primary current through the power switch, and to vary the ON-time of the switching control signal responsively to a difference between the current sense signal and the current reference signal.

16. The method of claim 14 wherein configuring the first circuit to form the current reference signal includes configuring the first circuit to decrease the value of the current reference signal responsively to the difference between the demagnetization time and the discharge time of the parasitic leakage inductance, and to increase the value of value of the current reference signal responsively to a remainder of a period of the switching control signal.

17. A method of forming a power supply controller comprising:
   forming the power supply controller to form a switching control signal to control a power switch to regulate an output current through a transformer to a desired value wherein the transformer includes a secondary winding to conduct a secondary current, and a parasitic leakage inductance;
   forming the power supply controller to sense a demagnetization time of the transformer;
   forming power supply controller to sense a discharge time of the parasitic leakage inductance; and
   forming the power supply controller to adjust a peak value of a primary current through the power switch responsively to a difference between the demagnetization time and the discharge time of the parasitic leakage inductance.

18. The method of claim 17 wherein forming the power supply controller to sense the discharge time of the parasitic leakage inductance includes forming the power supply controller to form a first signal representative of an end of the discharge time of the parasitic leakage inductance.

19. The method of claim 18 wherein forming the power supply controller to sense the demagnetization time of the transformer includes forming the power supply controller to form a second signal representative of an end of the demagnetization time of the transformer.

20. The method of claim 19 wherein forming the power supply controller to adjust the peak value of the primary current through the power switch includes forming the power supply controller to form a third signal that is representative of the difference between the demagnetization time and the discharge time of the parasitic leakage inductance and to use the third signal to adjust a value of a current reference signal used to adjust an ON-time of the power switch.

* * * * *